(12) United States Patent
Fellmann et al.

(10) Patent No.: US 9,151,363 B2
(45) Date of Patent: Oct. 6, 2015

(54) MULTI-STAGE GEARBOX OF PLANETARY CONSTRUCTION

(75) Inventors: Martin Fellmann, Friedrichshafen (DE); Stefan Beck, Eriskirch (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 194 days.

(21) Appl. No.: 13/993,772

(22) PCT Filed: Nov. 21, 2011

(86) PCT No.: PCT/EP2011/070508
§ 371 (c)(1),
(2), (4) Date: Jun. 13, 2013

(87) PCT Pub. No.: WO2012/084367
PCT Pub. Date: Jun. 28, 2012

(65) Prior Publication Data
US 2013/0260945 A1    Oct. 3, 2013

(30) Foreign Application Priority Data
Dec. 20, 2010  (DE) .......................... 10 2010 063 490

(51) Int. Cl.
*F16H 3/44*    (2006.01)
*F16H 3/62*    (2006.01)
*F16H 3/66*    (2006.01)

(52) U.S. Cl.
CPC .. *F16H 3/62* (2013.01); *F16H 3/66* (2013.01); *F16H 2200/0069* (2013.01);
(Continued)

(58) Field of Classification Search
CPC ............... F16H 2200/0069; F16H 2200/0078; F16H 2200/2012; F16H 2200/2046

USPC .......................................... 475/275–291, 330
See application file for complete search history.

(56) References Cited

U.S. PATENT DOCUMENTS 5,980,418 A    11/1999   Park
5,989,148 A    11/1999   Park
(Continued)

FOREIGN PATENT DOCUMENTS

DE    197 58 193 A1    4/1999
DE    198 28 150 A1    4/1999
(Continued)

OTHER PUBLICATIONS

German Search Report Corresponding to 10 2010 063 490.5 mailed Dec. 14, 2011.
(Continued)

*Primary Examiner* — Roger Pang
*Assistant Examiner* — Tinh Dang
(74) *Attorney, Agent, or Firm* — Davis & Bujold, P.L.L.C.; Michael J. Bujold

(57) ABSTRACT

A multi-stage planetary gearbox, in particular a torque split gearbox of a work machine, having a housing which accommodates four planetary gearsets, a plurality of shafts, and shift elements including brakes and clutches which implement different gear ratios between the drive and output shafts. The drive shaft couples a carrier of the third gearset which can couple, via a first clutch, a third shaft that is coupled to a ring gear of a second gearset and which can be connected, via a second clutch, to a fourth shaft connected to a sun gear of the third gearset. A fifth shaft couples a sun gear of the second gearset and can be locked, via a first brake, with the housing. A sixth shaft couples a ring gear of the third gearset and a carrier of the second gearset. The output shaft is coupled to a carrier of a fourth gearset.

19 Claims, 8 Drawing Sheets

(52) U.S. Cl.
CPC ............... *F16H 2200/0078* (2013.01); *F16H 2200/2012* (2013.01); *F16H 2200/2046* (2013.01); *F16H 2200/2097* (2013.01)

(56) References Cited

U.S. PATENT DOCUMENTS

| | | | |
|---|---|---|---|
| 6,837,823 B2 * | 1/2005 | Lee et al. | 475/296 |
| 7,651,431 B2 | 1/2010 | Phillips et al. | |
| 7,736,261 B2 | 6/2010 | Wittkopp et al. | |
| 7,758,464 B2 * | 7/2010 | Phillips et al. | 475/269 |
| 7,771,305 B1 | 8/2010 | Hart et al. | |
| 8,002,662 B2 | 8/2011 | Phillips et al. | |
| 8,016,710 B2 | 9/2011 | Wittkopp et al. | |
| 8,016,712 B2 | 9/2011 | Phillips et al. | |
| 8,016,713 B2 | 9/2011 | Phillips et al. | |
| 8,021,265 B2 | 9/2011 | Phillips et al. | |
| 8,047,949 B2 | 11/2011 | Hart et al. | |
| 8,047,954 B2 | 11/2011 | Phillips et al. | |
| 8,070,646 B2 | 12/2011 | Hart et al. | |
| 8,157,695 B2 | 4/2012 | Phillips et al. | |
| 8,226,521 B2 | 7/2012 | Wittkopp et al. | |
| 8,277,356 B2 | 10/2012 | Hart et al. | |
| 2002/0086765 A1 | 7/2002 | Takagi et al. | |
| 2004/0132576 A1 * | 7/2004 | Usoro et al. | 475/280 |
| 2004/0132577 A1 * | 7/2004 | Lee et al. | 475/280 |
| 2008/0242489 A1 * | 10/2008 | Phillips et al. | 475/276 |
| 2008/0261755 A1 | 10/2008 | Phillips et al. | |
| 2008/0261763 A1 * | 10/2008 | Phillips et al. | 475/276 |
| 2009/0017981 A1 | 1/2009 | Hukill et al. | |
| 2009/0036253 A1 * | 2/2009 | Phillips et al. | 475/275 |
| 2010/0210393 A1 | 8/2010 | Phillips et al. | |
| 2010/0279814 A1 | 11/2010 | Brehmer et al. | |
| 2012/0040796 A1 * | 2/2012 | Carey et al. | 475/275 |

FOREIGN PATENT DOCUMENTS

| | | |
|---|---|---|
| DE | 10 2008 015 919 A1 | 10/2008 |
| DE | 10 2008 015 934 A1 | 10/2008 |
| DE | 10 2008 019 136 A1 | 11/2008 |
| DE | 10 2008 019 138 A1 | 11/2008 |
| DE | 10 2008 019 357 A1 | 11/2008 |
| DE | 10 2008 019 420 A1 | 11/2008 |
| DE | 10 2008 019 423 A1 | 11/2008 |
| DE | 10 2008 021 720 A1 | 12/2008 |
| DE | 10 2008 026 831 A1 | 1/2009 |
| DE | 10 2008 032 013 A1 | 1/2009 |
| DE | 10 2008 035 117 A1 | 2/2009 |
| DE | 10 2007 055 808 A1 | 6/2009 |
| DE | 10 2010 005 292 A1 | 9/2010 |
| DE | 10 2010 007 332 A1 | 9/2010 |
| DE | 10 2010 007 354 A1 | 9/2010 |
| DE | 10 2010 007 613 A1 | 11/2010 |
| DE | 10 2010 007 972 A1 | 12/2010 |
| EP | 0 495 942 B1 | 1/1995 |
| WO | 2010/075211 A2 | 7/2010 |

OTHER PUBLICATIONS

German Search Report Corresponding to 10 2010 063 491.3 mailed Dec. 14, 2011.
International Search Report Corresponding to PCT/EP2011/070508 mailed Mar. 6, 2012.
International Search Report Corresponding to PCT/EP2011/070509 mailed Feb. 27, 2012.
Written Opinion Corresponding to PCT/EP2011/070508 mailed Mar. 6, 2012.
Written Opinion Corresponding to PCT/EP2011/070509 mailed Feb. 27, 2012.
International Preliminary Examination Report Corresponding to PCT/EP2011/070509 mailed Mar. 13, 2013.

* cited by examiner

| GEAR | 8 | 9 | 10 | 11 | 12 | 13 | i | φ |
|---|---|---|---|---|---|---|---|---|
| 1 |   | × | × | × |   |   | 3.300 | 1.176 |
| 2 | × | × |   | × |   |   | 2.807 | 1.207 |
| 3 | × | × | × |   |   |   | 2.326 | 1.154 |
| 4 | × | × |   |   |   | × | 2.016 | 1.187 |
| 5 | × |   | × |   |   | × | 1.698 | 1.176 |
| 6 | × |   |   | × |   | × | 1.444 | 1.208 |
| 7 | × |   |   |   | × | × | 1.195 | 1.195 |
| 8 |   |   |   | × | × | × | 1.000 | 1.176 |
| 9 | × |   |   | × | × |   | 0.850 | 1.206 |
| 10 | × |   | × |   | × |   | 0.705 | TOTAL 4.681 |
| Z1 |   | × |   | × |   | × | 2.464 | |
| Z2 |   | × | × |   |   | × | 2.139 | |
| M1 |   |   | × | × |   | × | 1.000 | |
| M2 |   |   | × | × | × |   | 1.000 | |
| M3 |   |   | × |   | × | × | 1.000 | |

MULTI-STAGE GEARBOX OF PLANETARY CONSTRUCTION

This application is a National Stage completion of PCT/EP2011/070508 filed Nov. 21, 2011, which claims priority from German patent application serial no. 10 2010 063 490.5 filed Dec. 20, 2010.

FIELD OF THE INVENTION

The invention concerns a multi-stage gearbox of a planetary construction, in particular a torque splitting gearbox of a drive machine, with a housing in which four planetary gearsets and several shafts are accommodated, and with shift elements which are designed at least as brakes and clutches, and through which, by selective activation, different transmission ratios can be implemented between a drive shaft and an output shaft.

BACKGROUND OF THE INVENTION

Such a multi-stage gearbox is preferably used as a torque splitting gearbox in drive machines whereby the available gears of the torque splitting gearbox are defined by selective activation of shift elements and hereby with an effective flow of force within planetary gearsets. A "torque splitting gearbox" is hereby commonly meant to be a gearbox unit through which several transmission ratios can be achieved with few step increments. In an overall transmission of an agricultural drive machine, such as a tractor, such a torque splitting gearbox, as a load shift gearbox, is commonly combined with another multi-gear gearbox in form of a group gearbox with large step increments, so that through this combination an overall transmission with a large number of presentable drive steps can be achieved, simultaneously with a large spread. Often, the additional gearbox segments are hereby added in the form of a crawl and/or a turn segment.

The multi-stage gearbox in a planetary construction is known through the EP 0495942 B1, which is combined as a torque splitting gearbox of an agriculture drive machine with a group gearbox. Hereby, this torque splitting gearbox has a housing in which four planetary gearsets and several shafts are positioned, of which one corresponds to the driveshaft and the other one, to the output shaft of the multi-stage gearbox. In addition, several shift elements are provided in the area of the shafts through which, by means of selective activation, the flow of power can be varied within the four planetary gearsets, and therefore different transmission ratios can be defined between the drive shaft and the output shaft. In total, eight transmission ratios of the multi-stage gearbox can be implemented.

SUMMARY OF THE INVENTION

It is the task of the present invention to propose a multi-stage gearbox in the above mentioned art, through which a large number of transmission ratios can be realized, with a low number of parts and therefore at a low weight and little manufacturing effort. Also, a nearly geometric gear ratio sequence shall be presented, and the stress of the individual gearbox elements shall be reduced. In addition, small and nearly geometric step increments between the individual transmission ratios shall be possible, as well as a compact construction. Finally, a large gear meshing efficiency shall be achieved.

Thus and in accordance with the invention, a multi-stage gearbox is proposed in planetary construction which accommodates, in an housing, a drive shaft and an output shaft, and additional, rotatable shafts and four planetary gearsets. The planetary gearsets are hereby preferably positioned in the axial direction, in the sequence of a first planetary gearset, second planetary gearset, third planetary gearset, fourth planetary gearset, and they are each preferably designed as minus planetary gearsets. But it is also possible, at locations where the interconnection allows for the exchange of single or several of the minus planetary gearsets into plus planetary gearsets, if simultaneously a carrier connection and a ring gear connection is exchanged and the amount of the stationary gear ratios is increased by one. Also, a different positioning of the planetary gearsets in the axial direction is possible, as compared to the previously described framework of the invention.

It is known that a simple minus planetary gearset comprises of a sun gear, a ring gear, and a carrier which is the bearing to carry the rotatable planetary gears, which each mesh with the sun gear and the ring gear. By locking the carrier, the opposite rotational direction is achieved for the ring gear in comparison to the sun gear.

To the contrary, a simple plus planetary gearset comprises of a sun gear, a ring gear, and a carrier which is the bearing for the rotatable inner and outer planetary gear wheels. Hereby, all inner planetary gears mesh with the sun gear and all outer planetary gears with the ring gear, whereby also each inner planetary gear meshes each with an outer planetary gear. Through a fixed carrier, the same rotational direction of the ring gear and the sun gear is achieved.

In accordance with the invention, the driveshaft is connected to a carrier of a third planetary gearset and can be coupled, via a first clutch, with a third shaft which is coupled to a ring gear of a second planetary gearset and which can be releasably coupled, via a second clutch, with a fourth shaft. This fourth shaft is also connected to a sun gear of the third planetary gearset, whereby a fifth shaft is coupled to a sun gear of the second planetary gearsets which can be fixed to the housing by means of a first brake. Also, a sixth shaft connects a ring gear of the third planetary gearset to a carrier of the second planetary gearset. Finally, also the output shaft is coupled to a carrier of a fourth planetary gearset.

Preferably, the driveshaft serves as the drive of the multi-stage gearbox, meaning to initiate a torque into the multi-stage gearbox. Thus, the driveshaft can be driven in particular by a drive engine, for instance a combustion engine or an electric motor. The output shaft serves therefore preferably as the output of the multi-stage gearbox, meaning to transmit torque from the multi-stage gearbox, in particular to drive an aggregate, for instance a pump or an electric generator, or a vehicle drive, for instance of a vehicle wheel or a vehicle metal crawler.

In a further embodiment of the invention, the fourth shaft is also coupled to a sun gear of the fourth planetary gearset and can be connected, via a third clutch, to the output shaft. The output shaft can also be coupled, via a fourth clutch, to a seventh shaft which is connected to a carrier of a first planetary gearset. Also, a sun gear of the first planetary gearset is coupled to the fifth shaft and a ring gear of the first planetary gearset to the sixth shaft. Finally the ring gear of the fourth planetary gearset is connected to the eighth shaft which can be firmly connected, via a second brake, to the housing.

In accordance with an alternative embodiment of the invention, the fourth shaft is also coupled to a sun gear of the fourth planetary gearset and can be connected, via a third clutch, to the output shaft. Hereby, this sixth shaft can be connected, via a fourth clutch, to a seventh shaft which is connected to a ring gear of a first planetary gearset. Also, a sun gear of the first planetary gearset is coupled to a fifth shaft and a carrier of the first planetary gearset to the output shaft, whereas a ring gear of the fourth planetary gearset is connected to the eighth shaft which can be firmly connected, via a second brake, to the housing.

Also alternatively hereto, the fourth shaft is also coupled to a sun gear of the fourth planetary gearset and can be connected, via a third clutch, to the output shaft. The fifth shaft can be connected, via a fourth clutch, to a seventh shaft which is connected to a sun gear of the first planetary gearset. Also a carrier of the first planetary gearset is coupled to the output shaft, and a ring gear of the first planetary gearset to the sixth shaft. Finally, a ring gear of the fourth planetary gearset is connected to the eighth shaft and can be firmly connected, via a second brake, to the housing.

In accordance with an additional alternative embodiment of the inventive multi-stage gearbox, the fourth shaft is also coupled to a sun gear of the fourth planetary gearset and can be connected, via a third clutch, to an eighth shaft, which is coupled to a ring gear of the fourth planetary gearset and which can be firmly connected, via a second brake, to the housing. Also, the fifth shaft can be coupled to a fourth clutch, to a seventh shaft which is connected to a sun gear of a first planetary gearset. Finally, the carrier of the first planetary gearset is connected to the output shaft and a ring gear of the first planetary gearset to the sixth shaft.

In an alternative, the fourth shaft is also coupled to a sun gear of the fourth planetary gearset and can be connected, via a third clutch, to an eighth shaft which is coupled to a ring gear of the fourth planetary gearset and which can be firmly connected, via a second brake at the housing. In addition, the sixth shaft can be connected, via a fourth clutch, to a seventh shaft, which is connected to a ring gear of a first planetary gearset. Also, a carrier of the first planetary gearset is connected to the output shaft and a sun gear of the first planetary gearset with the fifth shaft.

In accordance with an additional, alternative embodiment of an inventive multi-stage gearbox, the fourth shaft is also coupled to a sun gear of the fourth planetary gearset and can be connected, via a third clutch, to an eighth shaft which is coupled to a ring gear of the fourth planetary gearset and which can be firmly connected, via a second brake, to the housing. The output shaft can also be connected, via a fourth clutch, to a seventh shaft which is connected to a carrier of a first planetary gearset. Finally, also a sun gear of the first planetary gearset is connected to a fifth shaft and a ring gear of the first planetary gearset to a sixth shaft.

Also as an alternative, the output shaft can be connected, via a third clutch, to an eighth shaft which is coupled to a ring gear of the fourth planetary gearset and which can be firmly connected, via a second brake, to the housing. In addition, a fourth shaft is connected to a sun gear of the fourth planetary gearset, whereas the fifth shaft can be connected, via a fourth clutch, to a seventh shaft which is connected to a sun gear of the first planetary gearset. Finally, a carrier of the first planetary gearset is coupled to the output shaft and a ring gear of the first planetary gearset with the sixth shaft.

In accordance with an additional, alternative variation of the inventive multi-stage gearbox, an output shaft can be connected, via a third clutch, to an eighth shaft which is coupled to a ring gear of the fourth planetary gearset and which can be firmly connected to the housing. In addition, a fourth shaft is connected to a sun gear of the fourth planetary gearset, whereby the sixth shaft can be connected, via a fourth clutch, to a seventh shaft. In addition, a carrier of the first planetary gearset is coupled to the output shaft and a sun gear of the first planetary gearset by way of the fifth shaft.

As an additional alternative, the output shaft can be connected, via a third clutch, to an eighth shaft, which is coupled to a ring gear of the fourth planetary gearset and which can be connected in a rotationally fixed manner to the housing via a second brake. Also, the fourth shaft is connected to a sun gear of the fourth planetary gearset, and the output shaft can be coupled in addition, via a fourth clutch, to a seventh shaft, which is connected to a carrier of the first planetary gearset. Finally, a ring gear of the first planetary gearset is coupled to the sixth shaft and a sun gear of the first planetary gearset by way of the fifth shaft.

In the previously mentioned cases, a first gear ratio is created, via the engagement of the second brake, and the first and second clutches, whereas a second gear ratio can be selected by actuating both brakes, and the second clutch. A third gear ratio is implemented by the engagement of both brakes and the first clutch. In addition, a fourth gear ratio is implemented by actuating both brakes and the fourth clutch, whereby a fifth gear ratio is implemented by engagement of the first brake and the fourth clutch. Also, a sixth gear ratio can be by actuating the first brake and the second and the fourth clutches, whereas a seventh gear ratio is implemented by engagement of the first brake and the third and fourth clutches. An eighth gear ratio is implemented by actuating the second, third, and fourth clutches. As an alternative hereto, the eighth gear ratio can also be implemented by engaging the first, second, and fourth clutches, or by actuating the first, second, and third clutches, or by engaging the first, third, and fourth clutches. Finally, a ninth gear ratio can be implemented by actuating the first brake and the second and the third clutches, whereas a tenth gear ratio is implemented by engaging the first brake and the first and third clutches. Thus, ten gear ratios can be implemented in each of the embodiments in accordance with the inventive multi-stage gearbox.

In another embodiment, a first additional gear ratio is created by the engagement of the second brake, and the second and fourth clutches, and a second, additional gear ratio is created by the actuation of the second brake, and the first and fourth clutches. Hereby, the number of gears that can be implemented is increased to a total of twelve.

In accordance with an alternative embodiment of the invention, the output shaft can also be releasably connected, via a third clutch, to a fourth shaft and, via a fourth clutch, to a seventh shaft, which is coupled to a carrier of the first planetary gearset. In addition, a sun gear of the first planetary gearset is connected to the fifth shaft and a ring gear of the first planetary gearset to the sixth shaft. Finally, also a ring gear of the fourth planetary gearset is rigidly coupled to the housing and a fourth shaft can be connected, via a fifth clutch, to an eighth shaft which is connected to a sun gear of the fourth planetary gearset.

Alternatively hereto, the output shaft can also be releasably connected, via a third clutch, to a fourth shaft and the sixth shaft, via a fourth clutch, to a seventh shaft which is coupled to a ring gear of the first planetary gearset. In addition, a carrier of the first planetary gearset is connected to the output shaft, and a sun gear of the first planetary gearset with the fifth shaft. Finally, a ring gear of the fourth planetary gearset is rigidly coupled to the housing and the fourth shaft can be connected, via a fifth clutch, to an eighth shaft which is connected to a sun gear of the fourth planetary gearset.

As an additional alternative embodiment of an inventive multi-stage gearbox, the output shaft can also be releasably connected, via a third clutch, to the fourth shaft, and the fifth shaft, via the fourth clutch, to a seventh shaft, which is coupled to a sun gear of a first planetary gearset. Also, a carrier of the first planetary gearset is connected to the output shaft, and a ring gear of the first planetary gearset with the sixth shaft, whereas a ring gear of the fourth planetary gearset is rigidly coupled to the housing, and the fourth shaft can be connected, via a fifth clutch, to the eighth shaft which is connected to a sun gear of the fourth planetary gearset.

In the last mentioned cases, a first gear ratio is implemented by the engagement of the first, second, and fifth clutches, whereas a second gear ratio can be selected through the actuation of the first brake, as well as the second and fifth clutches. Also, a third gear ratio is implemented by the engagement of the first brake, as well as the first and the fifth clutches. In addition, a fourth gear ratio is implemented by the actuation of the first brake, as well as the fourth and fifth clutches, a following, fifth gear ratio through the engagement of the first brake, as well as the first and the fourth clutches. A sixth gear ratio is implemented by the actuation of the first brake, as well as the second and the fourth clutches, whereas a seventh gear ratio can be selected through the engagement of the first brake, as well as the third and the fourth clutches. Also, an eighth gear ratio is implemented by the actuation of the second, third, and fourth clutches. As an alternative hereto, the eighth gear ratio can also be implemented by the actuation of the first, second, and fourth clutches, or by actuation of the first, second, and third clutches or by the engagement of the first, third, and fourth clutches. A ninth gear ratio is implemented by the actuation of the first brake, as well as the second and third clutches, whereby a tenth gear ratio is executed through the engagement of the first brake, as well as the first and third clutches. Also in these cases, a multi-stage gearbox is again realized with ten presentable gear ratios.

A next embodiment of the invention results in a first, additional gear ratio through the engagement of the second brake, as well as the second and fourth clutches, and a second, additional gear ratio can be implemented by the actuation of the second brake, as well as the first and fourth clutches. Thus, a presentation of the amount of a total of twelve gear ratios is possible.

In a further embodiment of the invention, the output shaft of the multi-stage gearbox, for the realization of an auxiliary output, is in particular brought through the multi-stage gearbox and serves, in addition to the output shaft, as an additional, second output, for instance in the sense of a power take-off for exchangeable auxiliary aggregates.

Basically, the invention also comprises embodiments of the multi-stage gearbox in which the drive and output are cinematically able to be swapped with each other. Hereby, the mentioned output shaft of the multi-stage gearbox as its drive, to initiate a torque into the multi-stage gearbox, for instance through a drive engine, and the mentioned driveshaft of the multi-stage gearbox serves as its output, meaning to tap a torque of the multi-stage gear box, for instance to drive an aggregate or vehicle drive. The sequences of the gear ratios reverse accordingly at that time in a shift schematic of the multi-stage gearbox.

It is possible through the individual inventive embodiments of a multi-stage gearbox to realize the individual gear ratios with a low number of components and therefore to keep the manufacturing effort and the weight low. Also, it results hereby, in particular for a split gearbox of a work engine, in suitable, nearly geometric gear ratio sequence is and in each case small step increases which are also nearly geometrically designed.

In addition, the individual embodiments of the inventive multi-stage gearbox are characterized by low absolute and relative rotational speeds, as well as low planetary gearset and shift element torques, which has a positive impact with regards to life expectancy. In total, one can also achieve a good meshing efficiency, as well as a compact construction.

The invention is not limited to the following combinations and characteristics. It is also possible to also combine individual characteristics if they are part of the following description of the embodiments, or directly of the drawings. The references with regard to drawings, by use of reference characters, shall not limit the scope of the protection of the claims.

BRIEF DESCRIPTION OF THE DRAWINGS

Additional and improving measures of the invention are presented in the following with the description of preferred embodiments of the invention. It shows.

DETAILED DESCRIPTION OF THE PREFERRED EMBODIMENTS

Figures 1, 2:
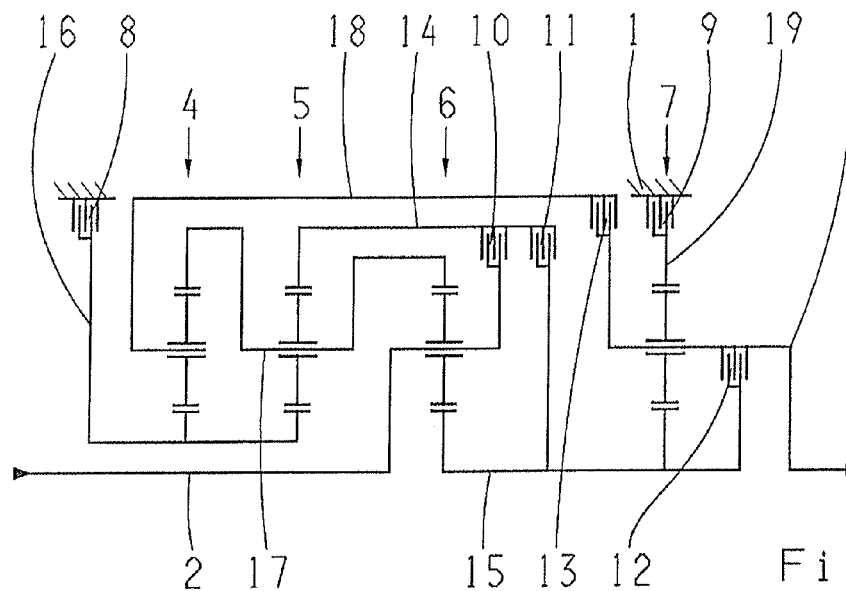
FIG. 1 a schematic view of a first, preferred embodiment of the inventive multi-stage gearbox.
FIG. 2 an exemplary shift schematic for a multi-stage gearbox in accordance with FIG. 1.

A first preferred embodiment of an inventive multi-stage gearbox is presented in FIG. 1, which shows a preferable torque split gearbox of a total transmission of a drive engine, whereby such a torque split gearbox is generally used in an overall transmission as a load shift gearbox in combination with a group gearbox, so that this combination of the torque split gearbox, in each case with low step increments, achieves in the group gearbox, in each case with large step increments, a large number of possible gear ratios and a large spread for the overall transmission. Due to the large number of available gear steps, a respective overall transmission design is suitable in particular for the use in an agriculture working machine. In addition, a preferred further combination of both of the previously mentioned gearbox units can be equipped with a crawler gear and/or a reversing unit. Hereby, a geometric sequence of the individual gearbox units in the overall transmission is in principle freely selectable.

It also can be seen in FIG. 1 that the inventive multi-stage gearbox has a housing 1 which accommodates a drive shaft 2, an output shaft 3, as well as four planetary gearsets 4, 5, 6, and 7. The planetary gearsets 4, 5, 6, and 7 are hereby designed each as minus planetary gearsets, but it is also possible for an embodiment, in accordance with the invention, to have at least one of the minus planetary gearsets be designed as plus planetary gearset. In this case, a carrier and a ring gear connection needs to be simultaneously exchanged and the amount of the stationary gear ratio, in comparison to the embodiment as a minus planetary gearset, needs to be increased by 1. Presently, the planetary gearsets 4, 5, 6, and 7 are viewed axially and positioned in the sequence 4, 5, 6, 7.

As further presented in FIG. 1, the inventive multi-stage gearbox comprises six shift elements in total, which consist of two brakes 8 and 9 and four clutches 10, 11, 12, and 13. A spatial positioning of these shift elements can hereby be performed in any way and is only limited by dimensions and external shape. In the present case, the brakes 8 and 9 and clutches 10, 11, 12, and 13 are each designed as disk shift elements however, in accordance with the invention, these can also be designed as form-locking shift elements or other friction-locking shift elements.

Through selective actuation of the shift elements, the selective shifting of different gear ratios between the driveshaft 2 and the output shaft 3 is possible. Also, the housing 1 accommodates eight rotatable shafts which are, besides the driveshaft 2 and the output shaft 3, configured by a third shaft 14, a fourth shaft 15, a fifth shaft 16, a sixth shaft 17, a seventh shaft 18, and an eighth shaft 19.

In accordance with the invention, the driveshaft 2 is connected to a carrier of the third planetary gearset 6 and can be connected, via the first clutch 10, to the third shaft 14 which is connected to a ring gear of the second planetary gearset 5. Also, the third shaft 14 can be releasably connected, via the second clutch 11, to the fourth shaft 15, whereby the fourth shaft 15 connects a sun gear of the third planetary gearset 6 with a sun gear of the fourth planetary gearset 7.

The fifth shaft 16 connects a sun gear of the first planetary gearset 4 with a sun gear of the second planetary gearset 5 and is also firmly connectable, via the first brake 8, to the housing 1. A ring gear of the first planetary gearset 4 is connected, via the sixth shaft 17, to the carrier of the secondary planetary gearset 5 and a ring gear of the third planetary gearset 6. Furthermore, the output shaft 3 is connected to a carrier of the fourth planetary gearset 7 and can be on one hand connected, via the third clutch 12, to the fourth shaft 15, and on the other hand, via the fourth clutch 13, to a seventh shaft 18. The seventh shaft 18 by itself is also connected to a carrier of the first planetary gearset 4. Finally, the ring gear of the fourth planetary gearset 7 is coupled to the eighth shaft 19 which can be firmly connected, via the second brake 9, to the housing 1.

FIG. 2 shows an exemplary shift scheme of a multi-stage gear box in accordance with FIG. 1, whereby for shifting, in each of the gear ratios, three of the six shift elements are engaged, and for shifting into a neighboring gear ratio, the shift state of only two shift elements needs to be changed. Hereby, the respective gear ratios i can be seen in the exemplary shift scheme with their respective gear ratio value, as well as the resulting gear increments φ for the neighboring gear. These values are hereby achieved in the preferred stationary gear ratios of the planetary gearsets 4, 5, 6, and 7 which in the first planetary gearset 4 and in the second planetary 5-3.300, in the third planetary gearset 6-1.800 and in the fourth planetary gearset 7 and the value of −2.300. Also, FIG. 2 shows the spread of the gearbox of 4.681.

As it can be seen in FIG. 2, a gear ratio sequence of the inventive multi-stage gearbox as in FIG. 1 comprises ten gear ratios whereby, as an option, two additional gear ratios can also be presented which are marked with Z1 and Z2. In addition an eighth gear ratio can be presented with a total of four shift variations.

A first gear ratio results from the engagement of the second brake 9, as well as the first clutch 10 and the second clutch 11. To shift into a next, second gear ratio, the first clutch 10 needs to be disengaged and the first brake 8 needs to be activated, whereby for a following, third gear ratio, the second clutch 11 needs to be disengaged and the first clutch 10 needs to be again activated. Starting from the third gear ratio, a fourth gear ratio results from disengaging again the first clutch 10 and engaging the fourth clutch 13, while for the selection of the fifth gear ratio the second brake 9 needs to be disengaged and the first clutch 10 is again to be activated. A sixth gear ratio results, starting with the fifth gear ratio, by disengaging again the first clutch 10, and by activating the second clutch 11. For an additional upshift into a seventh gear ratio, the second clutch 11 needs to be disengaged and the third clutch 12 needs to be engaged. To select the next higher, eighth gear ratio, the first brake 8 needs to be disengaged and the second clutch 11 needs to be activated, whereby here alternatively also a presentation of the eighth gear ratio is possible by the engagement of the first clutch 10, the second clutch 11, and the fourth clutch 13, or through the activation of the first clutch 10, the second clutch 11, and the third clutch 12, or by engagement of the first clutch 10, the third clutch 12, and the fourth clutch 13. These shift alternatives are marked in the exemplary shift scheme in FIG. 2 as M1 to M3. In addition, a ninth gear ratio results from the activation of the first brake 8, as well as the second clutch 11 and the third clutch 12. Finally, a tenth gear ratio is shifted where, starting with the ninth gear ratio, the second clutch 11 needs to be disengaged and the first clutch 10 needs to be activated.

Figure 3:
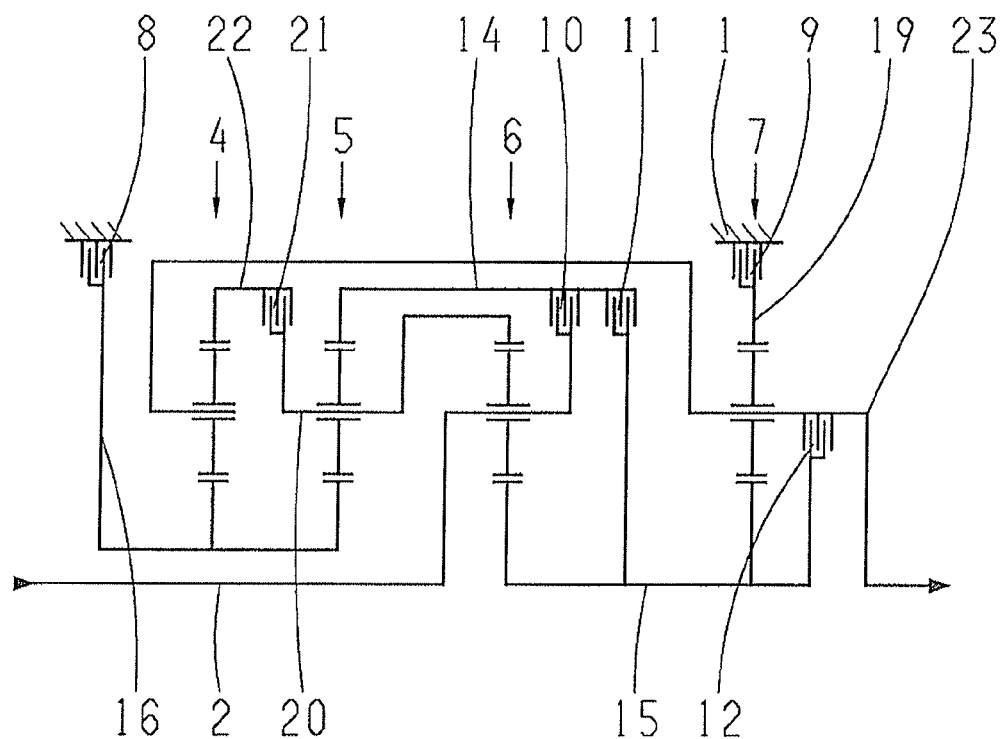
FIG. 3 a schematic view of a second, preferred embodiment of the inventive multi-stage gearbox.

In FIG. 3, a second, preferred embodiment of an inventive multi-stage gear box is presented. Different from the variation in the previously described section, a sixth shaft 20 connects a carrier of the second planetary gearset 5 with a ring gear of the third planetary gearset 6 and can be connected, via a fourth clutch 21, to a seventh shaft 22, which is connected to a ring gear of the first planetary gearset. Also, an output shaft 23 is connected to a carrier of the fourth planetary gearset 7 and the carrier of the first planetary gearset 4, and is able to be connected, via the third clutch 12, to the fourth shaft 15.

Hereby, in accordance with the second embodiment in FIG. 3, the configuration has the same operating effect as compared to the previous embodiment in accordance with FIG. 1, so that in the individual gear ratios, at the same stationary gear ratios of the planetary gearsets 4 to 7, the same gear ratios i, as well as the gear increments φ are achieved in accordance with the exemplary shift scheme in FIG. 2. Also, the shifting of the individual gear ratios differs from the description in FIG. 2 only in that, instead of the fourth clutch 13 in FIG. 1, the fourth clutch 21 in FIG. 3 is in each case to be activated.

Figure 4:
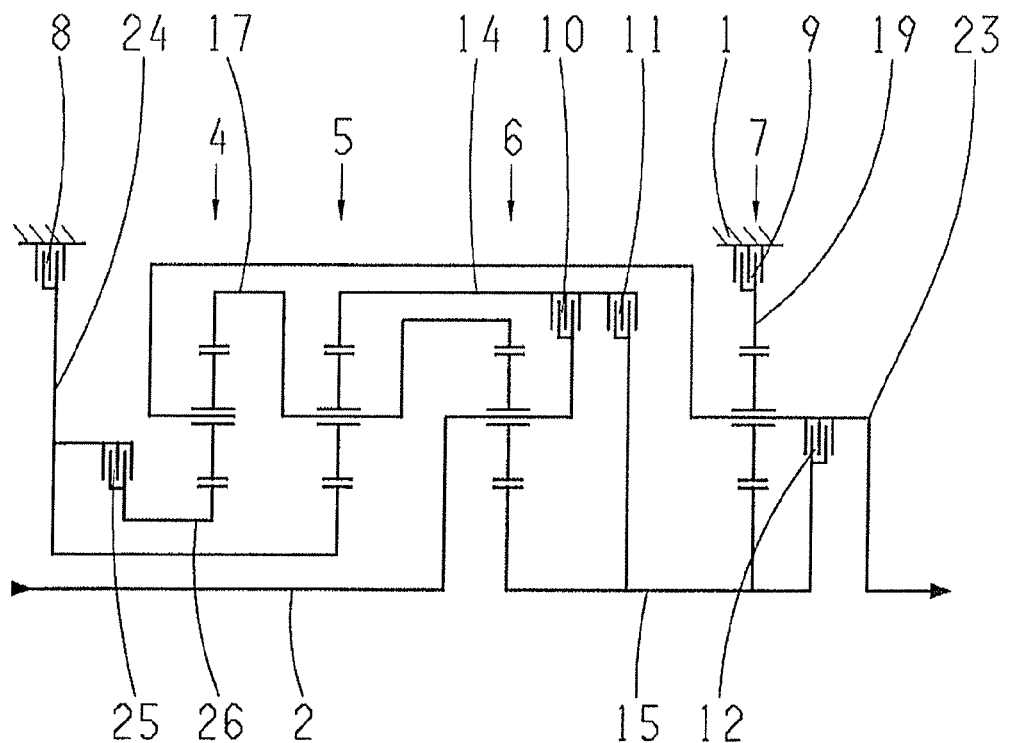
FIG. 4 a schematic view of an additional, third preferred embodiment of the inventive multi-stage gearbox.

FIG. 4 shows an additional, third preferred embodiment of the inventive multi-stage gearbox. Different from the embodiment of the invention as in FIG. 1, an output shaft 23 is connected to the carrier of the fourth planetary gearset 7 and the carrier of a first planetary gearset 4 and is able to be connected, via to the third clutch 12, to the fourth shaft 15. In addition, a fifth shaft 24 can in addition be connected, via a fourth clutch 25, with a seventh shaft 26, which is coupled to the sun gear of the first planetary gearset 4.

Also the embodiment in accordance with FIG. 4 represents an operationally equal gearbox variation to the embodiment as in FIG. 1. Due to this fact, the gear ratios i as presented in FIG. 2 are again achieved, as well as the gear increments cp.

Also shifting of the individual gear ratios through the activation of the shift elements matches the description for FIG. 2 where, instead of the fourth clutch 13 in FIG. 1, in each case the fourth clutch 25 in FIG. 4 needs to be activated.

Figure 5:
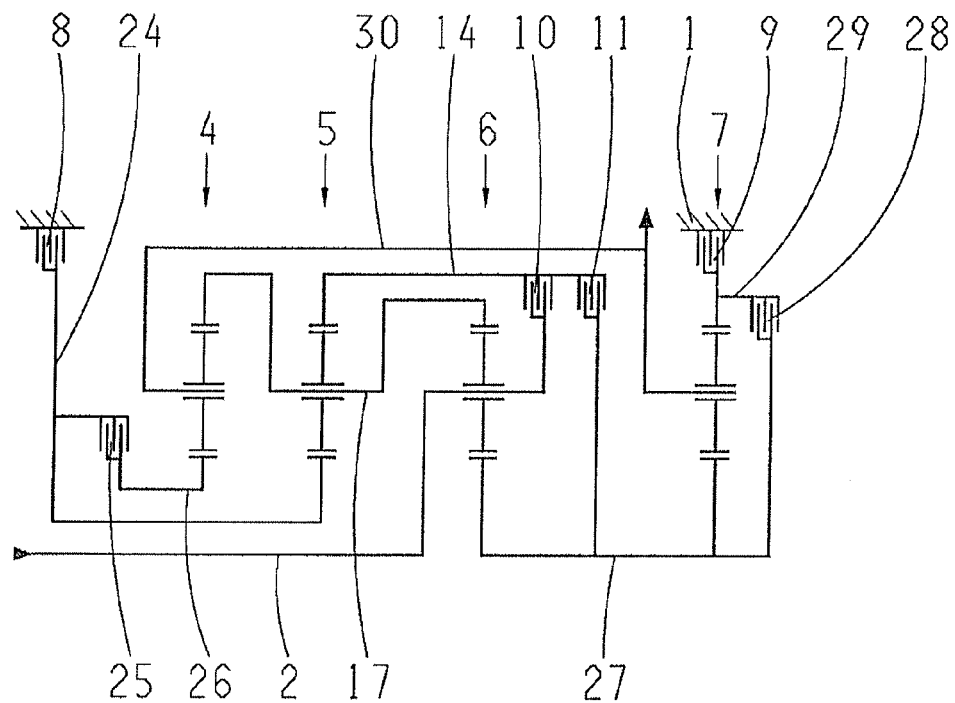
FIG. 5 a schematic view of a fourth, preferred embodiment of the inventive multi-stage gearbox.

Furthermore, FIG. 5 presents an additional, fourth embodiment of an inventive multi-stage gear box. The difference from the embodiment as in FIG. 1 is that a fourth shaft 27 is connected with a sun gear of the third planetary gearset 6 and a sun gear of the fourth planetary gearset 7, and is able to be connected, via the second clutch 11, to the third shaft 14 and, via a third clutch 28, to an eighth shaft 29. This eighth shaft is connected to a ring gear of the fourth planetary gearset 7 and can be firmly connected to the housing 1. In addition, as already in the variation as in FIG. 4, a fifth shaft 24 is able to be connected, via a fourth clutch 25, to a seventh shaft 26, which is coupled to the sun gear of the first planetary gearset 4. Finally, the output shaft 30 connects the carrier of the first planetary gearset 4 with the carrier of the fourth planetary gearset 7 whereby the output is arranged transverse to the drive by the driveshaft 2. Thus, the multi-stage gearbox as in FIG. 5 is designed in a front-transverse configuration.

The embodiment in accordance with FIG. 5 also represents an operationally equal embodiment of a multi-stage gearbox according to the variation in FIG. 1. Thus, the gearbox schemes as in FIG. 2 can also be used for the FIG. 5, except in order to shift the gear ratios as described in FIG. 2 the following modifications need to be made such that, instead of the third clutch 12 in FIG. 1, in each case the third clutch 28 in FIG. 5 needs to be activated, and in each case, instead of the fourth clutch 13 in FIG. 1, the fourth clutch 25 in FIG. 5 needs to be activated.

Figure 6:
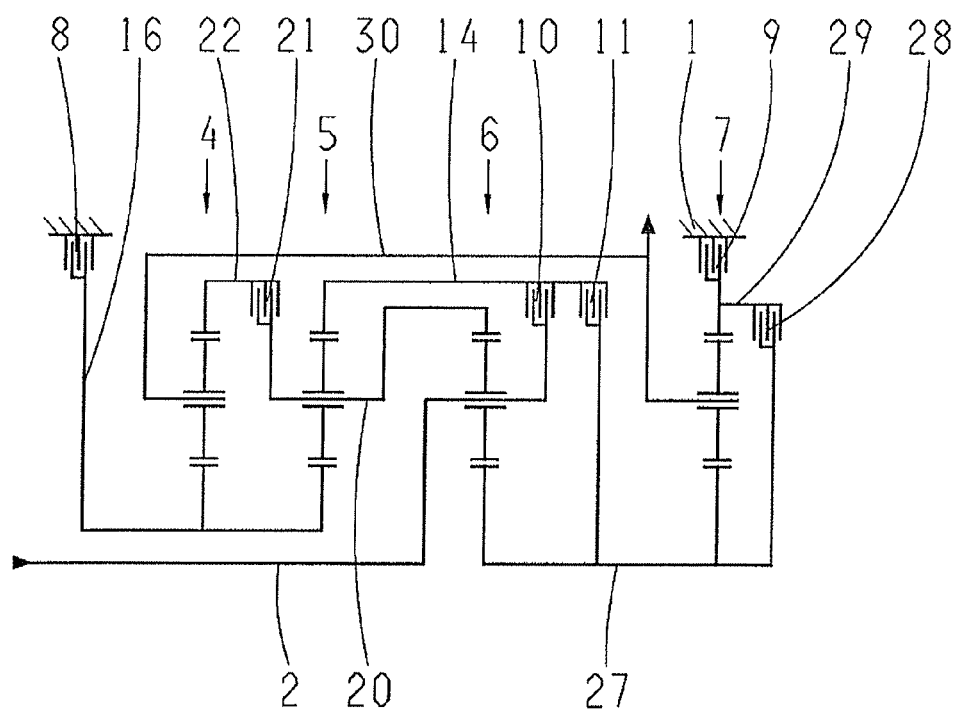
FIG. 6 a schematic presentation of a fifth, preferred embodiment of the inventive multi-stage gearbox.

Furthermore, FIG. 6 shows an additional, fifth embodiment of the inventive multi-stage gearbox. Different from the embodiment in accordance with FIG. 1 is hereby that a fourth shaft 27, as already shown in the previous variation in FIG. 5, can be connected, via a third clutch 28, to an eighth shaft 29, which is coupled to the ring gear of a fourth planetary gearset 7, and which can be firmly attached at the housing 1 through a second brake 9. In addition, an output shaft 30 also connects the carrier of the first planetary gearset 4 with the carrier of the fourth planetary gearset 7, whereby an output is created which is transverse to the drive via the driveshaft 2. Also, a sixth shaft 20 is connected to the ring gear of the third planetary gearset 6 and the carrier of the second planetary gearset 5, and can additionally be connected, via a fourth clutch 21, with a seventh shaft 22, which is connected to the ring gear of the first planetary gearset 4.

The exemplary shift scheme in accordance with FIG. 2 is here also again applicable for the embodiment in accordance with FIG. 6 with regard to the shifting and available gear ratios i and the gear increments φ, whereby with regard to the shifting of the gear ratios, the shift scheme needs to be modified such that, instead of the third clutch 12 in FIG. 1, in each case the third clutch 28 in FIG. 6 and, instead of the fourth clutch 13 in FIG. 1, in each case the fourth clutch 21 in FIG. 6 needs to be activated.

Figure 7:
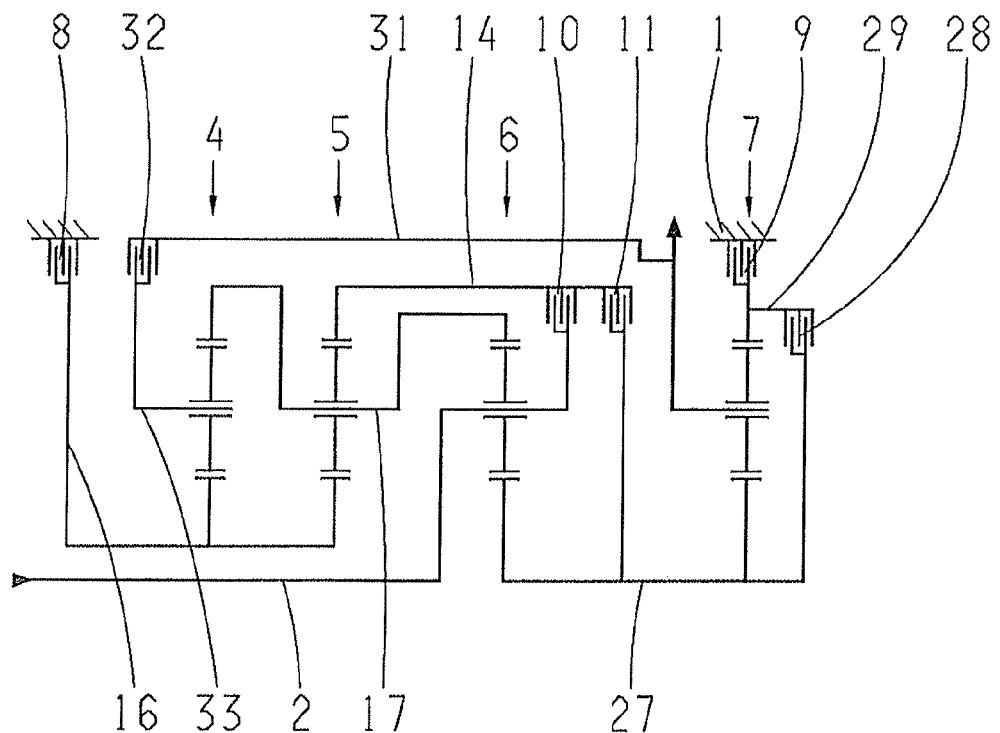
FIG. 7 a schematic view of an additional, sixth preferred embodiment of the inventive multi-stage gearbox.

A sixth preferred embodiment of an inventive multi-stage gearbox is presented in FIG. 7. Different to the embodiment as in FIG. 1, and matching with FIGS. 5 and 6, a fourth shaft 27 can be connected, via a third clutch 28, with an eighth shaft 29, which is connected to the ring gear of the fourth planetary gearset 7 and which can be firmly connected at the housing 1 by way of the second brake 9. Furthermore, it differs from the embodiment shown in FIG. 1 in that an output shaft 31 is connected with the carrier of the fourth planetary gearset 7, and can also be connected, via a fourth clutch 32, to a seventh shaft 33, which is connected to the carrier of the first planetary gearset 4.

Also in the case of the variation as in FIG. 7, the exemplary shift scheme as in FIG. 2 can be applied again with regard to the available gear ratios i and the gear increments φ, as well as the shifting of the gear ratios, whereby here the exemplary shift scheme in accordance with FIG. 2 needs to be modified such that, instead of the third clutch 12 in FIG. 1, in each case the third clutch 28 in FIG. 7, and instead of the fourth clutch 13 in FIG. 1, in each case the fourth clutch 32 in FIG. 7 needs to be activated.

Figure 8:
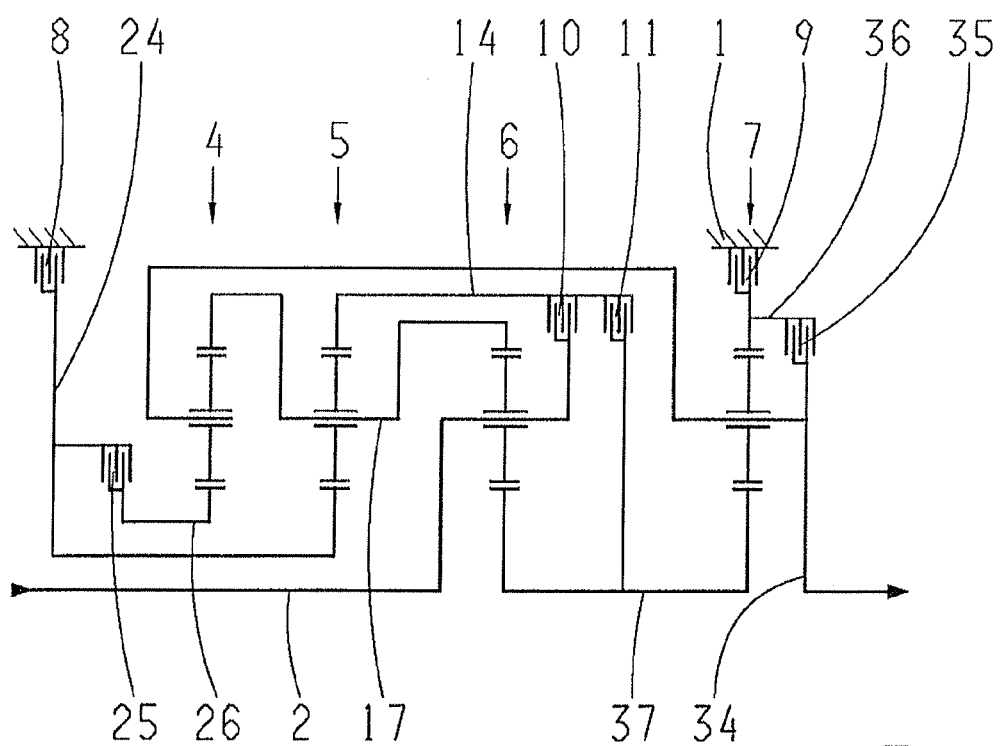
FIG. 8 a schematic view of a seventh, preferred embodiment of the inventive multi-stage gearbox.

In addition, FIG. 8 presents a seventh embodiment of an inventive multi-stage gearbox which differs from the embodiment in accordance with FIG. 1 in a way that a fifth shaft 24, as already shown in the variations of FIG. 4 and FIG. 5, can be connected, via a fourth clutch 25, to a seventh shaft 26, which is coupled to the sun gear of the first planetary gearset 4. In addition, an output shaft 34 is connected to the carrier of a first planetary gearset 4 and the carrier of a fourth planetary gearset 7, and can also be releasably connected, via a third clutch 35, to an eighth shaft 36, which is here connected to the ring gear of the fourth planetary gearset 7 and which can be firmly connected to the housing 1 by way of a second brake 9. Finally, a fourth shaft 37 is connected with the sun gear of the third planetary gearset 6 and the sun gear of the fourth planetary gearset 7 and can be connected, via a second clutch 11, with the third shaft 14.

With regard to the shifting of gear ratios of the multi-staged gearbox in accordance with FIG. 8, the exemplary shift scheme as shown in FIG. 2 needs to be modified in that, instead of the third clutch 12 in FIG. 1, in each case the third clutch 35 in FIG. 8 and, instead of the fourth clutch 13 in FIG. 1, in each case the fourth clutch 25 in FIG. 8 needs to be activated. The available gear ratios i and the gear increments φ again match with the respective stationary gear ratios of the planetary gearsets 4 to 7 with the listed values in FIG. 2.

Figure 9:
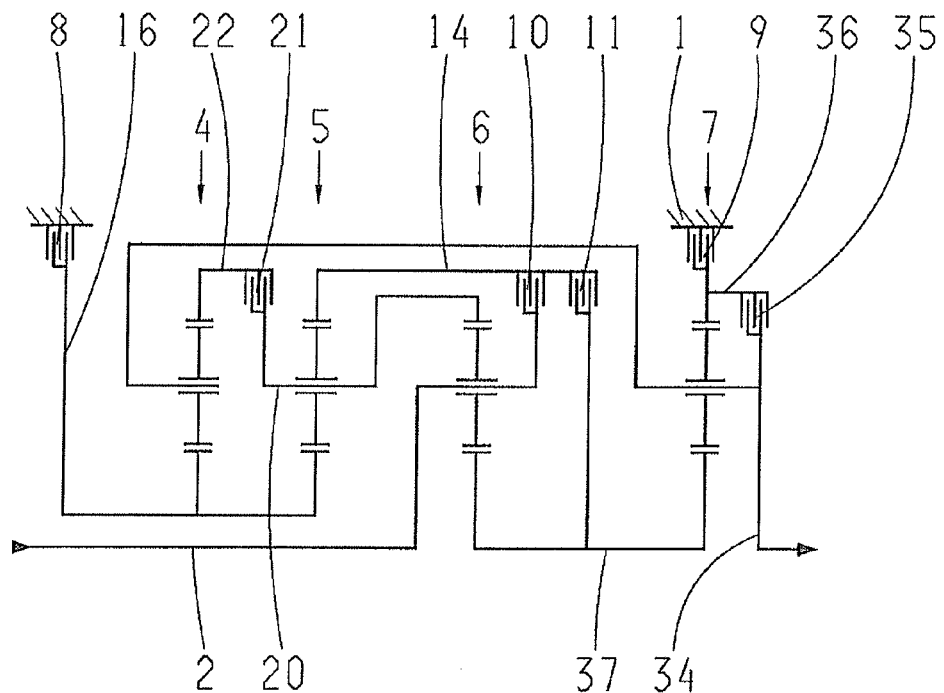
FIG. 9 an additional, schematic presentation of an eighth, preferred embodiment of the inventive multi-stage gearbox.

An additional, eighth preferred embodiment of an inventive multi-stage gearbox is presented in FIG. 9. A difference from the embodiment in accordance with FIG. 1 is that a sixth shaft 20 is connected with the carrier of a second planetary gearset 5 and a ring gear of the third planetary gearset 6, and can be connected, via a fourth clutch 21, with a seventh shaft 22, which is connected to the ring gear of the first planetary gearset 4.

Also, as already in the previous variation, an output shaft 34 is connected with a carrier of the first planetary gearset 4 and the carrier of a fourth planetary gearset 7, and can also be releasably connected, via a third clutch 35, to an eighth shaft 36. This eighth shaft 36 is also coupled to the ring gear of the fourth planetary gearset 7 and can be firmly connected to the housing 1 by way of the second brake 9. Finally, a fourth shaft 37 is connected to the sun gears of the third planetary gearset 6 and the fourth planetary gearset 7, and can also be connected, via a second clutch 11, with the third shaft 14.

With regard to the available gear ratios i, as well as the gear increments φ between the individual gear ratios, the variation as shown in FIG. 9 also matches the embodiment as in FIG. 1. Regarding the shifting of the individual gear ratios, instead of the third clutch 12 as shown in FIG. 1, in each case the third clutch 35 in FIG. 9 has to be activated, and instead of the fourth clutch 13 in FIG. 1, in each case the fourth clutch 21 in FIG. 9 needs to be activated.

Figure 10:
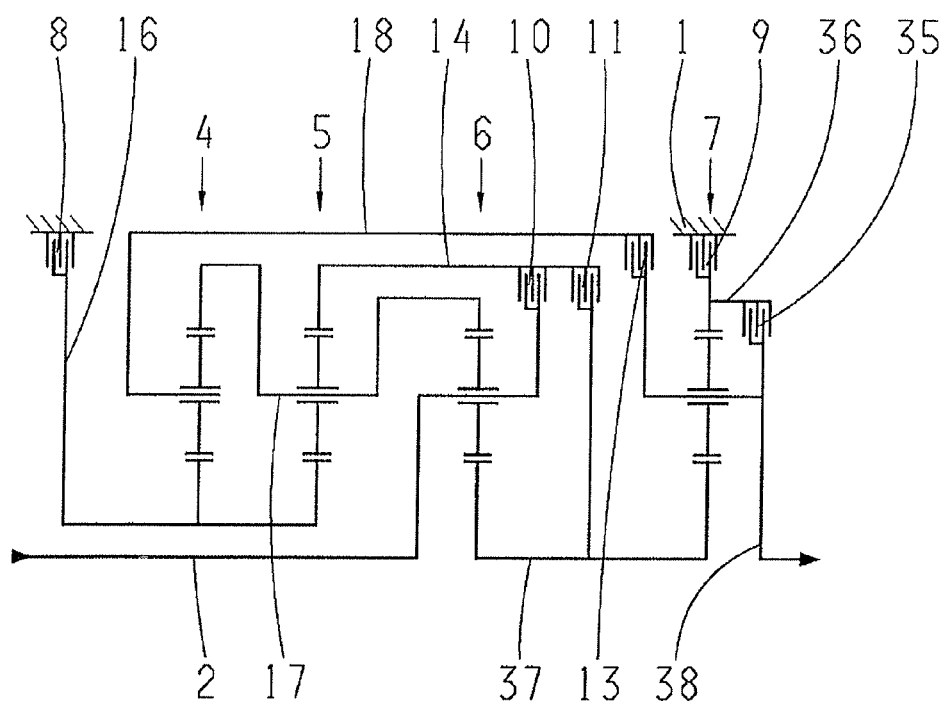
FIG. 10 an additional, schematic presentation of a ninth preferred embodiment of the invention.

Furthermore, FIG. 10 presents an additional, ninth preferred embodiment of the inventive multi-staged gearbox. A difference from the variation in accordance with FIG. 1 is that the output shaft 38 is connected with the carrier of a fourth planetary gearset 7 and is also selectively coupled, via a fourth clutch 13, to the seventh shaft 18, and can be releasably connected, via a third clutch 35, with an eighth shaft 36. This eighth shaft 36 is, as already for instance in the previous variation as in FIG. 9, again coupled to a ring gear of the fourth planetary gearset 7 and can be firmly attached to the housing 1 by way of a second brake 9. Also, again a fourth shaft 37 is connected to the sun gears of the third planetary gearset 6 and the fourth planetary gearset 7, and additionally with the second clutch 11.

With regard to the shifting of the gear ratios of the gearbox variation in accordance with FIG. 10, the exemplary shift scheme as shown in FIG. 2 needs to be modified such that instead of the third clutch 12 in FIG. 1, in each case the third clutch 35 in FIG. 10 needs to be activated. Also the ninth, preferred embodiment represents a same operational effective variation as in the embodiment in accordance with FIG. 1.

Figure 11:
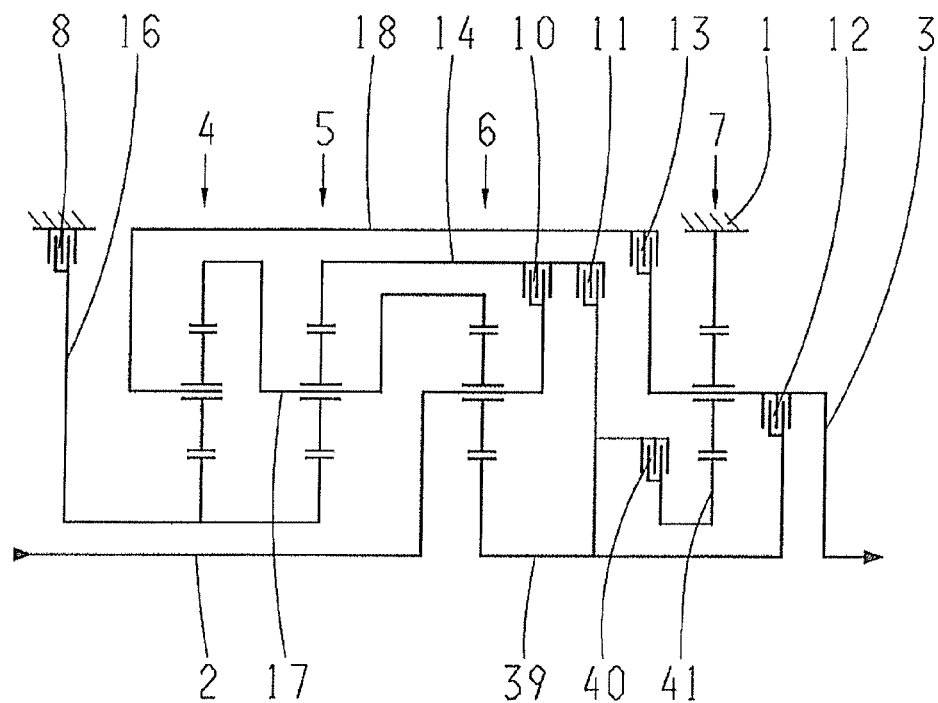
FIG. 11 a schematic view of an additional, tenth preferred embodiment of the inventive multi-stage gearbox.

An additional, tenth preferred embodiment of a multi-stage gearbox is presented in FIG. 11. It differs from the variation in accordance with FIG. 1 in that a fourth shaft 39 can be connected, via a fifth clutch 40, with an eighth shaft 41 which is connected to the sun gear of the fourth planetary gearset 7. In addition, the ring gear of the fourth planetary gearset 7 is connected to the housing 1 in a rotationally fixed manner.

The shifting of gear ratios of the multi-stage gearbox of FIG. 11 takes place in accordance with the exemplary shift scheme in FIG. 2 except that, instead of the second brake 9 in FIG. 1, in each case the fifth clutch 40 in FIG. 11 needs to be engaged. Also the tenth embodiment of a multi-stage gearbox presents again the same effective operation variation as compared to the embodiment in accordance with FIG. 1.

Figure 12:
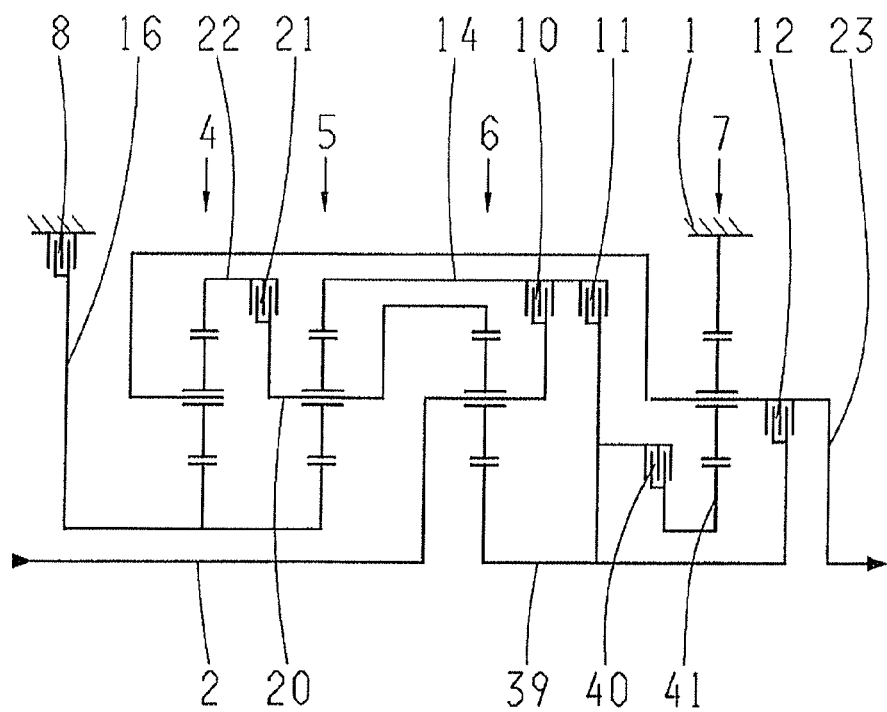
FIG. 12 a schematic view of an eleventh embodiment of the inventive multi-stage gearbox.

In addition, FIG. 12 presents an additional, eleventh preferred embodiment of a multi-stage gearbox. This variation differs from the embodiment as shown in FIG. 1 in that the output shaft 23 connects the carrier of the first planetary gearset 4 with the carrier of the fourth planetary gearset 7. In addition, a sixth shaft 20 is connected with a carrier of the second planetary gearset 5 and the ring gear of the third planetary gearset 6 and can be coupled, via a fourth clutch 21, to a seventh shaft 22, which is connected to the ring gear of the first planetary gearset 4. Also, a fourth shaft 39 can also be releasably connected, via a fifth clutch 40, to an eighth shaft 41 which is coupled to the sun gear of the fourth planetary gearset 7. Finally, the ring gear of the fourth planetary gearset 7 is connected to the housing 1 in a rotationally fixed manner.

The variation in accordance with FIG. 12 presents embodiment that is also operationally equal to the embodiment in accordance with FIG. 1, except that the exemplary shift scheme in accordance with FIG. 2 needs to be modified with regard to the shifting of the gear ratios such that, instead of the fourth clutch 13 in FIG. 1, in each case the fourth clutch 21 in FIG. 12 needs to be activated and, instead of the second brake 9 in FIG. 1, in each case the fifth clutch 40 in FIG. 12 needs to be activated.

Figure 13:
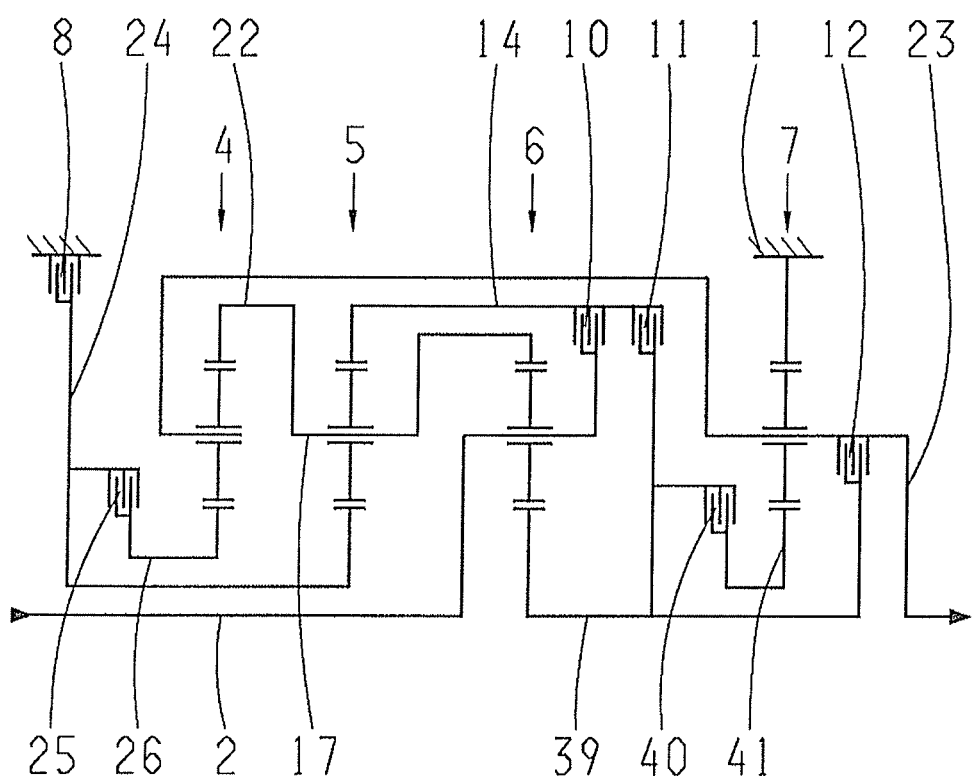
FIG. 13 an additional, schematic presentation of a twelfth, preferred embodiment of the inventive multi-stage gearbox.
Figure 14:
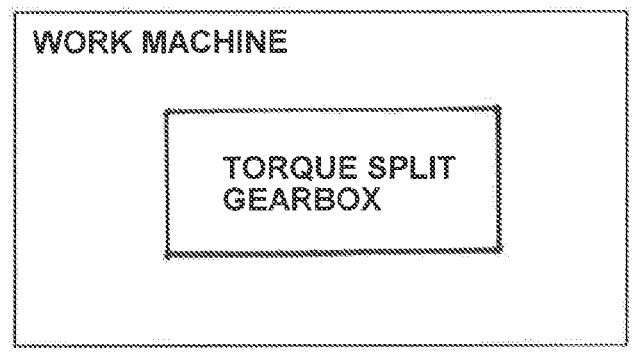
FIG. 14 diagrammatically shows a multi-stage gearbox which comprises a torque split gearbox incorporated into a work machine.

Finally, FIG. 13 shows a last, twelfth preferred embodiment of the inventive multi-stage gearbox. Also in this case, an output shaft 23, different from the embodiment as in FIG. 1, connects the carrier of the first planetary gearset 4 with the carrier of the fourth planetary gearset 7. Also, a fourth shaft 39 can also be releasably connected, via a fifth clutch 40, to an eighth shaft 41, which is connected to a sun gear of the fourth planetary gearset 7, while the ring gear of the fourth planetary gearset 7 is connected to the housing 1 in a rotationally fixed manner. Finally, a fifth shaft 24 can also be connected, via a fourth clutch 25, with a seventh shaft 26. Furthermore, this seventh shaft 26 is connected to a sun gear of the first planetary gearset 4.

Also the last, twelfth embodiment of an inventive multi-stage gearbox presents a variation that is operationally equal to the of the gearbox in FIG. 1. The shifting scheme as shown in FIG. 2 needs to be modified such that, instead of the fourth clutch 13 in FIG. 1, in each case the fourth clutch 25 in FIG. 13 and, instead of the second brake 9 in FIG. 1, in each case the fifth clutch 40 in FIG. 13 needs to be activated.

Through the individual, inventive embodiments of a multi-stage gearbox, a torque split gearbox for a work vehicle can be achieved with a little manufacturing effort and a low weight. In addition, the inventive multi-stage gearbox has each a load absolute and relative rotational speed, as well as load planetary gearset torques and shift element torques. Finally, in each case the achievements are a proper transmission ratio sequence and proper meshing efficiencies, with simultaneously almost geometric step increments.

The multi-stage gearbox according to the invention is preferably constructed coaxial, but the output may also as in the case of the embodiments shown in FIG. 5, FIG. 6 and FIG. 7 be realized at the side of the transmission (axis-parallel).

It is possible, in accordance with the invention, to eliminate individual shift elements or to replace them with a rigid connection, which results in each case in a multi-stage gearbox with a reduced number of available transmission ratios. Preferably, in the case of the embodiment as in FIG. 1, the elimination of the third clutch 12 or the second brake 9 could be executed, which would result in each case in a multi-stage gearbox with a lesser number of available gears. A further, preferred embodiment with a reduced number of gears can be achieved by the replacement of the first brake 8 with a rigid connection between the fifth shaft (16; 24) with the housing 1.

It is also possible in accordance with the invention to provide freewheel in each suitable position of the multi-stage gearbox, for instance between a shaft and the housing, or maybe to connect two shafts. In addition, the output can be positioned in principle anywhere where on the respective output shaft, and the input can be positioned in principle anywhere on the respective driveshaft.

In the framework of an advantageous further embodiment, the respective driveshaft can be disengaged from a drive motor, as needed, by a coupling element such as a hydrodynamic torque converter, a hydrodynamic clutch, a dry start clutch, a wet start clutch, a magnetic powder clutch, a centrifugal clutch, etc. It is also possible to arrange a starting element in the power flow direction after the gearbox, in this case the respective driveshaft is constantly connected to the crankshaft of the drive engine. As an alternative, a shift element of the multi-stage gearbox can also be used as an internal starting element. This starting element should preferably be engaged in the potential starting gears, meaning that it is engaged during the starting procedure.

It is also possible to position a torsional vibration damper between the drive engine and the gearbox.

Finally, it is also possible in the framework of the invention to position on each shaft, preferably the respective driveshaft or the respective output shaft, an electric machine as a generator and/or as an additional drive engine. Obviously, also each constructed embodiment, in particular each spatial positioning of the planetary gearsets and the shift elements by itself or among each other, and if it makes technically sense, are part of the protection under the claims, without an influence on the function of the gearbox as it is explained in the claims, even if this embodiment is not explicitly presented in this schematic or in the description.

REFERENCE CHARACTERS

1 Housing
2 Drive Shaft
3 Drive Shaft
4 First Planetary gearset
5 Second Planetary gearset
6 Third Planetary gearset
7 Fourth Planetary gearset
8 First Brake
9 Second Brake
10 First Clutch
11 Second Clutch
12 Third Clutch
13 Fourth Clutch
14 Third Shaft
15 Fourth Shaft
16 Fifth Shaft
17 Sixth Shaft
18 Seventh Shaft
19 Eighth Shaft
20 Sixth Shaft
21 Fourth Clutch
22 Seventh Shaft
23 Output Shaft
24 Fifth Shaft
25 Fourth Clutch
26 Seventh Shaft
27 Fourth Shaft
28 Third Clutch
29 Eighth Shaft
30 Output Shaft
31 Output Shaft
32 Fourth Clutch
33 Seventh Shaft
34 Output Shaft
35 Third Clutch
36 Eighth Shaft
37 Fourth Shaft
38 Output Shaft
39 Fourth Shaft
40 Fifth Clutch
41 Eighth Shaft

The invention claimed is:

1. A multi-stage gearbox of a planetary construction comprising:
a housing accommodating first, second, third and fourth planetary gearsets, a plurality of shafts, and a plurality of shift elements comprising at least one brake and at least four clutches which can establish different gear ratios between a drive shaft and an output shaft,
the drive shaft being directly connected with a carrier of the third planetary gearset which is releaseably coupled, via engagement of a first clutch, with a third shaft (14), and the third shaft being coupled with a ring gear of the second planetary gearset,
the carrier of the third planetary gearset being releasably connected, via engagement of a second clutch, with a fourth shaft connected with a sun gear of the third planetary gearset,
a fifth shaft being coupled with a sun gear of the second planetary gearset and being releasably connected with the housing via engagement of a first brake,
a sixth shaft connecting a ring gear of the third planetary gearset with a carrier of the second planetary gearset, and
the output shaft being directly coupled with a carrier of the fourth planetary gearset and the output shaft being either directly coupled or coupled by engagement of the clutches with a carrier of the first planetary gearset.

2. The multi-stage gearbox according to claim 1, wherein the fourth shaft is also coupled with a sun gear of the fourth planetary gearset and is connectable, via engagement of a third clutch, with the output shaft,
the output shaft is connectable, via engagement of a fourth clutch, with a seventh shaft which is connected with the carrier of the first planetary gearset,
a sun gear of the first planetary gearset is coupled with the fifth shaft,
a ring gear of the first planetary gearset is coupled with the sixth shaft, and
a ring gear of the fourth planetary gearset is connected with the eighth shaft which is connectable, via engagement of a second brake, with the housing.

3. The multi-stage gearbox according to claim 1, wherein the fourth shaft is also coupled with a sun gear of the fourth planetary gearset and is connectable, via engagement of a third clutch, with the output shaft,
the sixth shaft is connectable, via engagement of a fourth clutch, with a seventh shaft connected with a ring gear of the first planetary gearset,
a sun gear of the first planetary gearset is coupled with the fifth shaft,
the carrier of the first planetary gearset is directly coupled with the output shaft, and
a ring gear of the fourth planetary gearset is connected with an eighth shaft, which is releaseably connectable, via engagement of a second brake, with the housing.

4. The multi-stage gearbox according to claim 1, wherein the fourth shaft is also coupled with a sun gear of the fourth planetary gearset and is connectable, via engagement of a third clutch, with the output shaft,
the fifth shaft is connectable, via engagement of a fourth clutch, with a seventh shaft which is connected with a sun gear of the first planetary gearset,
the carrier of the first planetary gearset is directly coupled with the output shaft,
a ring gear of the first planetary gearset is connected with the sixth shaft, and
a ring gear of the fourth planetary gearset is connected with an eighth shaft which is connectable, via engagement of a second brake, with the housing.

5. The multi-stage gearbox according to claim 1, wherein the fourth shaft is also coupled with a sun gear of the fourth planetary gearset and is connectable, via engagement of a third clutch, with an eighth shaft, the eight shaft is coupled with a ring gear of the fourth planetary gearset and the ring gear of the fourth planetary gearset is connectable, via engagement of a second brake, with the housing,
the fifth shaft is connectable, via engagement of a fourth clutch, with a seventh shaft which is connected with a sun gear of the first planetary gearset,
the carrier of the first planetary gearset is directly connected with the output shaft,
and a ring gear of the first planetary gearset is connected with the sixth shaft.

6. The multi-stage gearbox according to claim 1, wherein the fourth shaft is also coupled with a sun gear of the fourth planetary gearset and is connectable, via engagement of a third clutch, with the eighth shaft, which is coupled with a ring gear of the fourth planetary gearset, and the ring gear of the fourth planetary gearset is connectable, via engagement of a second brake, with the housing, the sixth shaft is connectable, via engagement of a fourth clutch, with a seventh shaft which is connected with a ring gear of the first planetary gearset, the carrier of the first planetary gearset is directly connected with the output shaft, and a sun gear of the first planetary gearset is connected with the fifth shaft.

7. The multi-stage gearbox according to claim 1, wherein the fourth shaft is also coupled with a sun gear of the fourth planetary gearset and is connectable, via engagement of a third clutch, with the eighth shaft which is coupled with a ring gear of the fourth planetary gearset, and the ring gear of the fourth planetary gearset is connectable, via engagement of a second brake, with the housing, the output shaft is connectable, via engagement of a fourth clutch, with a seventh shaft which is connected with the carrier of the first planetary gearset, a sun gear of the first planetary gearset is connected with the fifth shaft, and a ring gear of the first planetary gearset is connected with the sixth shaft.

8. The multi-stage gearbox according to claim 1, wherein the output shaft is connectable, via engagement of a third clutch with an eighth shaft which is coupled with a ring gear of the fourth planetary gearset, and the ring gear of the fourth planetary gearset is connectable, via engagement of a second brake, with the housing, the fourth shaft is connected with a sun gear of the fourth planetary gearset, the fifth shaft is connectable, via engagement of a fourth clutch, with an eighth shaft which is connected with a sun gear of a first planetary gearset, the carrier of the first planetary gearset is directly coupled with the output shaft, and a ring gear of the first planetary gearset is connected with the sixth shaft.

9. The multi-stage gearbox according to claim 1, wherein the output shaft is connectable; via engagement of a third clutch, with an eighth shaft which is coupled with a ring gear of the fourth planetary gearset, and the ring gear of the fourth planetary gearset is connectable, via engagement of a second brake, with the housing, the fourth shaft is connected with a sun gear of the fourth planetary gearset, the six shaft is connectable, via engagement of a fourth clutch, with a seventh shaft which is connected with a ring gear of the first planetary gearset, the carrier of the first planetary gearset is directly coupled with the output shaft, and a sun gear of the first planetary gearset is connect with the fifth shaft.

10. The multi-stage gearbox according to claim 1, wherein the output shaft is connectable, via engagement of a third clutch, with an eighth shaft which is coupled with a ring gear of the fourth planetary gearset, the ring gear of the fourth planetary gearset is connectable, via engagement of a second brake, with the housing, the fourth shaft is connected with a sun gear of the fourth planetary gearset, the output shaft is connectable, via engagement of a fourth clutch, with a seventh shaft which is connected with the carrier of the first planetary gearset, a ring gear of the first planetary gearset is coupled with the sixth shaft, and a sun gear of the first planetary gearset is connected with the fifth shaft.

11. The multi-stage gearbox according to claim 2, wherein a first gear ratio is achieved by engagement of the second brake and the first and the second clutches, a second gear ratio is achieved by engagement of the first and the second brakes and the second clutch, a third gear ratio is achieved by engagement of the first and the second brakes and the first clutch, a fourth gear ratio is achieved by engagement of both the first and the second brakes and the fourth clutch, a fifth gear ratio is achieved by engagement of the first brake and the first and the fourth clutches, a sixth gear ratio is achieved by engagement of the first brake and the second and the fourth clutches, a seventh gear ratio is achieved by engagement of the first brake and the third and the fourth clutches, an eighth gear ratio is achieved by one of:
engagement of the second, the third and the fourth clutches,
engagement of the first, the second, and the third clutch, or
engagement of the first, the third and the fourth clutch, a ninth gear ratio is achieved by engagement of the first brake and the second and the third clutches, and a tenth gear ratio is achieved by engagement of the first brake the first and the third clutches.

12. The multi-stage gearbox according to claim 11, wherein a first, additional gear ratio is achieved by engagement of the second brake and the second and the fourth clutches, and a second, additional gear ratio is achieved by engagement of the second brake and the first and fourth clutches.

13. The multi-stage gearbox according to claim 1, wherein the output shaft is connectable, via engagement of a third clutch, with the fourth shaft, the output shaft is connectable, via engagement of a fourth clutch, with the seventh shaft which is coupled with the carrier of the first planetary gearset, a sun gear of the first planetary gearset is connected with the fifth shaft, and a ring gear of the first planetary gearset is connected with the sixth shaft.

14. The mufti-stage gearbox according to claim 1, wherein the output shaft is connectable, via engagement of a third clutch, with the fourth shaft, the six shaft is connectable, via engagement of a fourth clutch, with a seventh shaft which is coupled with a ring gear of the first planetary gearset, the carrier of the first planetary gearset is directly connected with the output shaft, a ring gear of the fourth planetary gearset is coupled with the housing, and the fourth shaft is connectable, via engagement of a fifth clutch, with the eighth shaft which is connected with a sun gear of the fourth planetary gearset.

15. The multi-stage gearbox according to claim 1, wherein the output shaft is connectable, via engagement of a third clutch, with the fourth shaft, the fifth shaft is connectable, via engagement of a fourth clutch, with a seventh shaft which is coupled with a sun gear of the first planetary gearset, the carrier of the first planetary gearset is directly connected with the output shaft, a ring gear of the first planetary gearset is connected with the sixth shaft, a ring gear of the fourth planetary gearset is coupled with the housing, and the fourth shaft is connectable, via engagement of a fifth clutch, with an eighth shaft which is connected with a sun gear of the fourth planetary gearset.

16. The multi-stage gearbox according to claim 13, wherein a first gear ratio is achieved by engagement of the first, the second, and the fifth clutches,
a second gear ratio is achieved by engagement of the first brake and the second and the fifth clutches,
a third gear ratio is achieved by engagement of the first brake and the first and the fifth clutches,
a fourth gear ratio is achieved by engagement of the first brake and the fourth and the fifth clutches,
a fifth gear ratio is achieved by engagement of the first brake and the first and the fourth clutches,
a sixth gear ratio is achieved by engagement of the first brake and the second and the fourth clutches,
a seventh gear ratio is achieved by engagement of the first brake and the third and the fourth clutches,
an eighth gear ratio is achieved by one of:
 engagement of the second, third, and the fourth clutches,
 engagement of the first, the second, and the fourth clutches,
 engagement of the first, the second, and the third clutches, or
 engagement of the first, the third, and the fourth clutches,
a ninth gear ratio is achieved by engagement of the first brake and the second and the third clutches, and
a tenth gear ratio is achieved by engagement of the first brake and as the first and the third clutches.

17. The multi-stage gearbox according to claim 16, wherein a first additional gear ratio is achieved by engagement of the second, the fourth and the fifth clutches, and a second additional gear ratio is achieved by engagement of the first, the fourth and the fifth clutches.

18. The multi-stage gearbox according to claim 1, wherein the output shaft serves as a drive from the multi-stage gearbox and the drive shaft serves as an input into the multi-stage gearbox.

19. The multi-stage gearbox according to claim 1, wherein the multi-stage gearbox comprises a torque split gearbox incorporated into a work machine.

* * * * *